United States Patent [19]

Sakurai et al.

[11] Patent Number: 5,171,728

[45] Date of Patent: Dec. 15, 1992

[54] CATALYST FOR OXIDIZING CARBON-CONTAINING COMPOUNDS AND METHOD FOR THE PRODUCTION OF THE SAME

[75] Inventors: Toshihiko Sakurai, Kunitachi; Toshio Yamaguchi; Takao Suzuki, both of Tokyo, all of Japan

[73] Assignees: N. E. Chemcat Corporation; Sumitomo Metal Mining Co., Ltd., Tokyo, Japan

[21] Appl. No.: 813,795

[22] Filed: Dec. 26, 1991

[30] Foreign Application Priority Data

Dec. 29, 1990 [JP] Japan ................................. 2-417009

[51] Int. Cl.$^5$ ..................... B01J 21/02; B01J 21/12; B01J 23/44
[52] U.S. Cl. .................................. 502/178; 502/207; 502/200
[58] Field of Search .................. 502/207, 178, 200

[56] References Cited

U.S. PATENT DOCUMENTS

| | | | |
|---|---|---|---|
| 3,170,758 | 9/1960 | Honerkamp | 423/213.5 |
| 4,672,049 | 6/1987 | Chen et al. | 502/207 X |
| 5,000,929 | 3/1991 | Horiuchi et al. | 423/213.5 |

FOREIGN PATENT DOCUMENTS

| | | | |
|---|---|---|---|
| 0275681 | 7/1988 | European Pat. Off. | |
| 2546770 | 12/1984 | France | |
| 51-022694 | 2/1976 | Japan | 502/207 |
| 51-034890 | 3/1976 | Japan | 502/207 |

Primary Examiner—W. J. Shine
Assistant Examiner—Douglas J. McGinty
Attorney, Agent, or Firm—Wenderoth, Lind & Ponack

[57] ABSTRACT

A catalyst for oxidizing a carbon-containing compound comprising a composite oxide powder composed of 4 to 19% by weight of silica, 3 to 10% by weight of boria, and the balance alumina, and palladium in an amount of 3 to 100 g per 1 liter of the powder carried on the composite powder, and a method for producing such a catalyst are described. The composite oxide is thermally stable and prevents reduction of palladium oxide, and the catalyst can be used for an extended period high temperatures.

10 Claims, 4 Drawing Sheets

Fig. 1

RELATIONSHIP BETWEEN $SiO_2$ CONTENT AND SPECIFIC SURFACE AREA IN $SiO_2$ – $Al_2O_3$ SYSTEM

Fig. 3

RELATIONSHIP BETWEEN AMOUNT OF $B_2O_3$ ADDED
TO $Al_2O_3$ AND SPECIFIC SURFACE AREA
( CALCINED AT 1300°C )

Fig. 4

LOSS OF WEIGHT UPON HEATING Pd CATALYST

CATALYST FOR OXIDIZING CARBON-CONTAINING COMPOUNDS AND METHOD FOR THE PRODUCTION OF THE SAME

BACKGROUND OF THE INVENTION

1. Field of the Invention

The present invention relates to a catalyst for oxidizing carbon-containing compounds and a method for the production of the same. More particularly, the present invention relates to a catalyst whose performance is not deteriorated at catalyst temperatures of 800° C. or higher and which is useful for catalytic oxidation of gaseous fuels or exhaust gases containing one or more combustible gases such as hydrogen, carbon monoxide, methane, propane, and butane, liquid fuels such as kerosene, gas oil, and alcohols as well as combustible organic compounds, and a method for the production of the same.

2. Description of the Prior Art

It is a recent trend that the use of catalytic oxidation has been increasing in order to oxidize gases containing a high concentration of a fuel or a combustible component (such as an organic solvent or a hydrocarbon) to produce gas at high temperature is then used directly as a heat source for a heater, boiler, gas turbine or the like, or indirectly as a heat source for a boiler by means of a heat exchanger.

Among these sources, systems exist whose catalyst temperature was reach 700° C. or even be as high as 1,400° C. Hence, at such high temperature regions, not only heat resistance sufficient for retaining the performance of the catalyst becomes necessary, but also the use of an oxidation catalyst having a high activity in order to cope with a high space velocity, SV, (gas flow per unit time/volume of catalyst) or a high linear velocity, LV.

As the aforementioned type of catalyst, those catalysts comprised of a carrier composed of γ-alumina, silica, or silica-alumina, having thereon platinum and/or palladium are known to be most active and used widely.

However, the conventional catalysts suffer from a loss of carrier surface area such as γ-alumina, silica, or silica-alumina when they are exposed to high temperatures. When platinum catalysts are used at temperatures above 600° C., fine platinum particles dispersed in the catalysts aggregate, resulting in a decrease in the catalytic activity. It is generally known that, for palladium catalysts (which have an excellent resistance to heat during vapor phase oxidation reactions), palladium oxide, i.e., active species, is converted to reduced palladium at a temperature near 830° C. so that the oxidation activity of the catalyst decreases abruptly. Hence, in the case of catalytic oxidation of high concentration gases, various special measures have been considered. That is, trouble has been taken to dilute the gases with the air to decrease the concentration of combustible components so that the catalyst temperature during the oxidation reaction will not increase to 600° C. or higher, or use is made of a plurality of catalyst layers of which an upstream catalyst layer is made of a catalyst having a coarse-mesh honeycomb support carrying palladium and/or platinum thereon to physically decrease the reactivity of the catalyst while controlling outlet gas temperature to 600° to 800° C. or less so that the catalyst can be free of undue thermal load. The former is disadvantageous in that it calls for an apparatus of a larger size and a larger amount of catalyst, which is uneconomical. On the other hand, the latter generally gives only insufficient results because a portion of combustible components remain unused.

Japanese Patent Application Laid-Open No. 113487/1975 proposes calcination of a mixture of metal oxides such as calcium, strontium, barium, silicon, tin and the like as a means for improving the thermal resistance of a carrier such as γ-alumina. However, the composite oxides are still insufficient in their thermal resistance.

SUMMARY OF THE INVENTION

An objective of the present invention is to provide an oxidation catalyst which retains a prolonged catalyst life for oxidation of combustible gases and the like in which the catalyst temperature may be 800° C. or higher and a method for producing the same.

According to the present invention, the above objective can be met by a catalyst for oxidizing a carbon-containing compound (Catalyst I), which comprises a composite oxide powder composed of 4 to 19% by weight of silica, 3 to 10% by weight of boria, and the balance alumina, and palladium in an amount of 3 to 100 g per 1 liter of the powder carried on the powder.

Further, according to the present invention, the above objective can also be solved by a catalyst for oxidizing a carbon-containing compound (Catalyst II), which comprises a molded article consisting of a composite oxide powder composed of 4 to 19% by weight of silica, 3 to 10% by weight of boria, and the balance alumina, and palladium in an amount of 3 to 100 g per 1 liter of the powder carried on the molded article of the composite powder.

Still further, according to the present invention, the above objective can be solved by a catalyst for oxidizing a carbon-containing compound (catalyst III), which comprises the catalyst I and a heat-resistant support carrying the catalyst I thereon.

Yet, according to the present invention, the above objective can be solved by a catalyst for oxidizing a carbon-containing compound (catalyst IV), which comprises a heat-resistant support having carried thereon a composite oxide powder composed of 4 to 19% by weight of silica, 3 to 10% by weight of boria, and the balance alumina, and palladium in an amount of 3 to 100 g per 1 liter of the carrier (composite oxide powder coated support).

Further, according to the present invention, the above objective can be solved by a method for producing the catalyst I (method I), which comprises the steps of providing a composite oxide powder composed of 4 to 19% by weight of silica, 3 to 10% by weight of boria, and the balance alumina; dipping the composite oxide powder in a solution containing palladium; drying the dipped powder; and calcining the dried powder.

Further, according to the present invention, the above objective can be solved by a method for producing the catalyst II, which comprises the steps of providing a molded article of a composite oxide powder composed of 4 to 19% by weight of silica, 3 to 10% by weight of boria, and the balance alumina; dipping the molded article in a solution containing palladium; drying the dipped molded article; and calcining the dried molded article.

Still further, according to the present invention, the above objective can be solved by a method for producing the catalyst III, which comprises the steps of providing a composite oxide composed of 4 to 19% by weight of silica, 3 to 10% by weight of boria, and the balance alumina; dipping the composite oxide powder in a solution containing palladium; drying the dipped powder; calcining the dried powder to prepare a palladium-carrying composite oxide powder; preparing a slurry composed of the palladium-carrying composite oxide powder, an adhesive mass and water; applying the slurry on a heat-resistant support; drying the support; and calcining the support.

Yet, according to the present invention, the above objective can be solved by a method for producing the catalyst IV (method IV), which comprises the steps of preparing a slurry composed of a composite oxide powder composed of 4 to 19% by weight of silica, 3 to 10% by weight of boria, and the balance alumina, an adhesive mass and water; applying the slurry on a heat-resistant support; drying the support; calcining the support to prepare a heat-resistant carrier having carried thereon the composite oxide; dipping the heat-resistant carrier having carried thereon the composite oxide in a solution containing palladium; drying the carrier; and calcining the carrier.

DETAILED DESCRIPTION OF THE PREFERRED EMBODIMENTS:

Hereafter, the present invention will be described in more detail.

In order to achieve the aforementioned objects, the present inventors have investigated various composite oxide materials and proportions thereof, supposing that it is necessary to use a heat-resistant composition for the carrier of a catalyst serving as a skeleton of the catalyst for obtaining a catalyst with an improved heat resistance. As a result, the present inventors have found that a composite oxide powder composed of 4 to 19% by weight of silica, 3 to 10% by weight of boria, and the balance alumina has an excellent heat resistance, and that palladium carried on the composite powder in an amount of 3 to 100 g per liter of the powder can exist stably in the form of palladium oxide at temperatures of 800° C. or higher.

The composite oxide powder composed of silica, boria and alumina and having an excellent thermal stability may be utilized as it is as a carrier but it may better be converted into a molded article to carry 3 to 100 g/liter of palladium thereon so that it can find a wider range of application as an oxidation catalyst.

The present inventors have also found an oxidation catalyst comprising a heat-resistant porous support, for example, a honeycomb structure or a perforated plate made of a heat-resistant ceramics material such as cordierite, or alumina, or a perforated plate made of a heat-resistant alloy, and a cover layer provided on the surface of the support and composed of a composite oxide powder composed of silica, boria and alumina and having an excellent thermal stability such that palladium can exist in an amount of 3 to 100 g/liter of carrier as well as a method for producing such a catalyst, thus achieving the present invention.

The composite oxide composed of silica, boria and alumina has a high BET specific surface area of 45 $m^2/g$ when calcined at 1,200° C.

The composite oxide may be used alone as a heat-resistant molded article in the form of a sphere, extruded product or pellet, but in order to reduce pressure losses, it may be coated on the surface of a porous support. When a porous support is used, it is necessary to increase the apparent surface area per volume in order to make it easy to coat the composite oxide on the porous support. Suitable materials therefor are heat-resistant ceramics, heat-resistant alloys, etc. Suitable shapes are honeycombs, perforated plates, for example, porous bodies made of cordierite, mullite, alumina-silica, alumina titanate, zirconia, silicon carbide, silicon nitride, etc., porous metals such as wire mesh, metal foam, a punching metal or expanded metal, made of heat-resistant metals such as iron, nickel, copper, titanium, chromium tungsten, zirconium or alloys thereof.

As an index for the thermal stability of the composite oxide at high temperatures, BET specific surface area by nitrogen adsorption of the material concerned after calcination at a high temperature may be used for the evaluation of such thermal stability.

Figure 1:
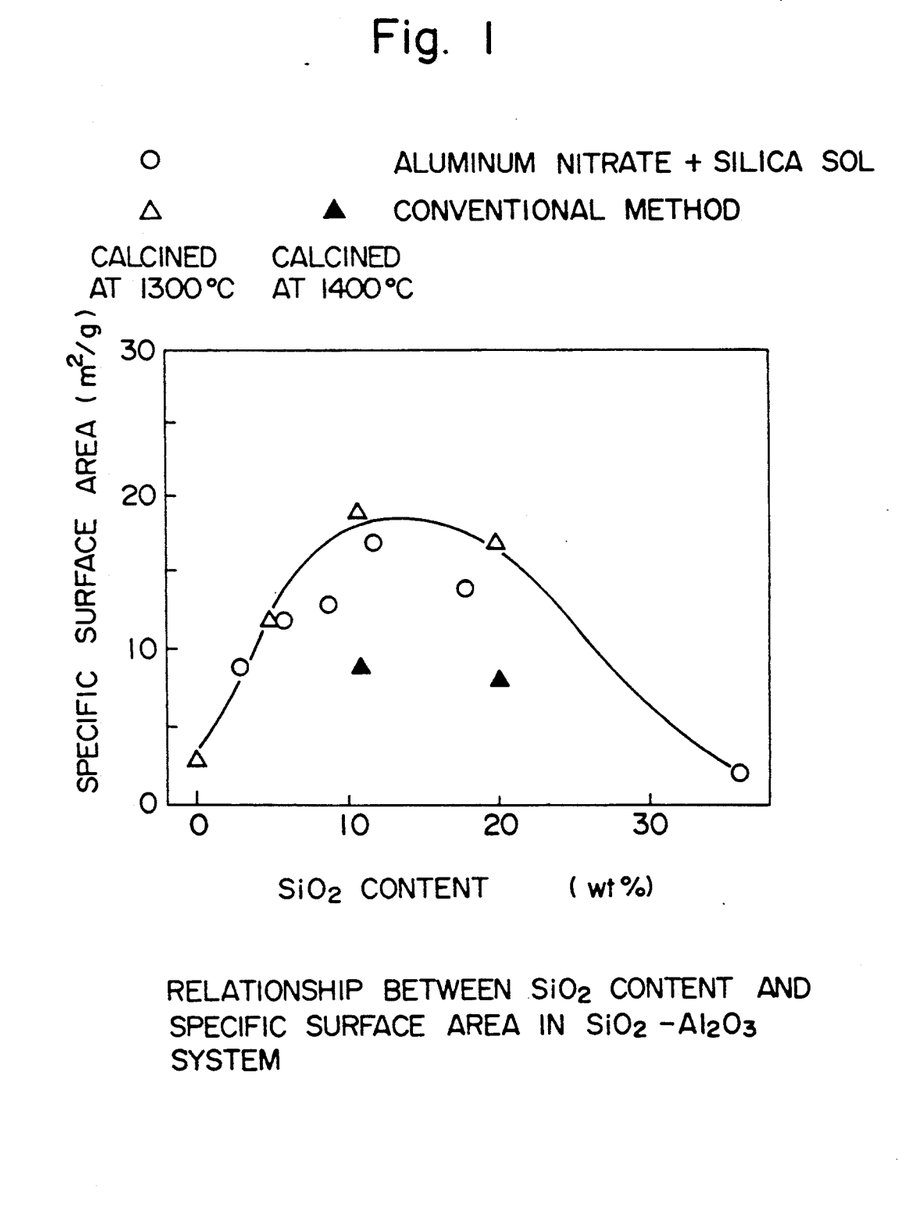
FIG. 1 is a graph illustrating a relationship between $SiO_2$ content and specific surface area of an $SiO_2$-$Al_2O_3$ system.
Figure 2:
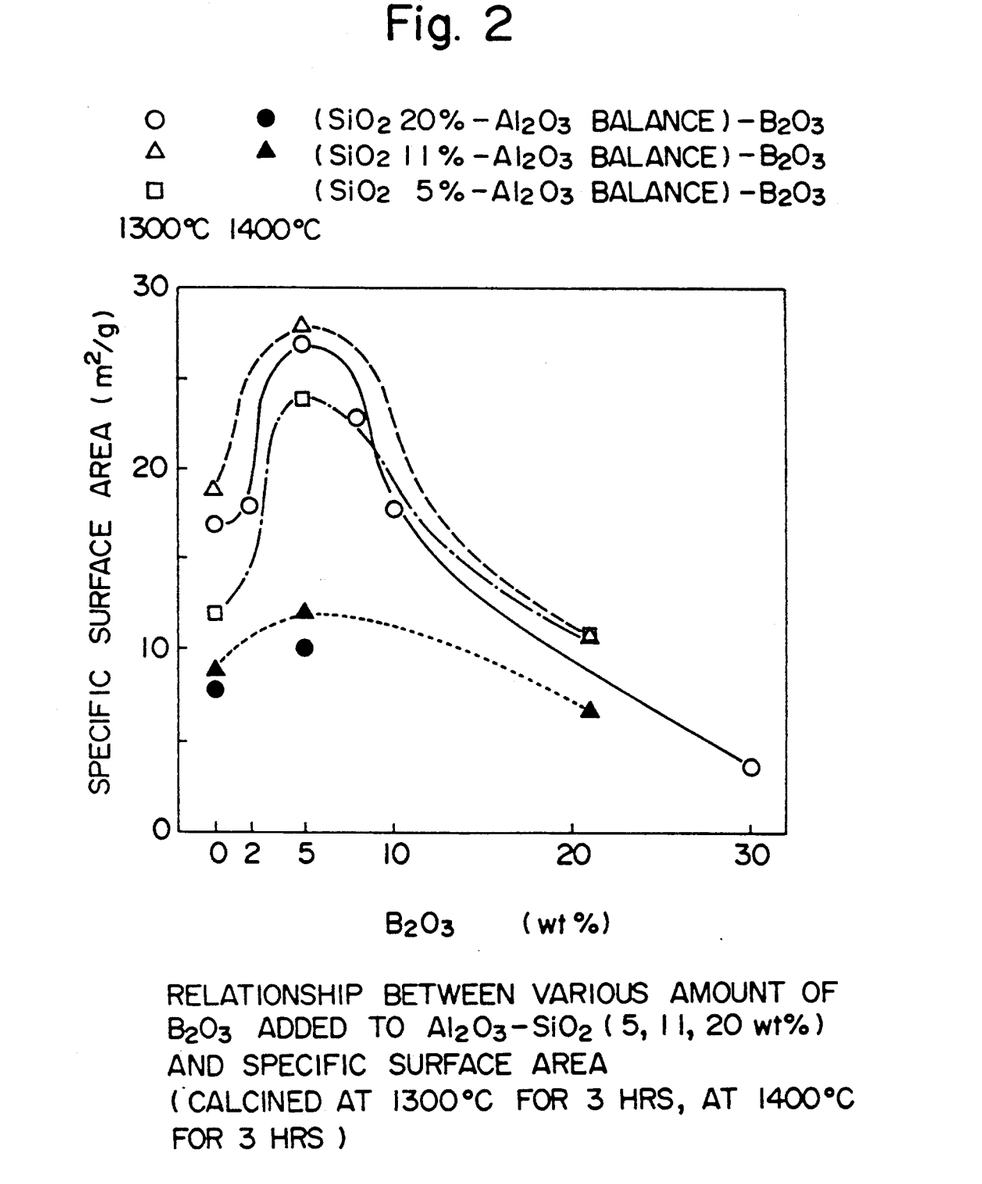
FIG. 2 is a graph illustrating a relationship between $B_2O_3$ content and specific surface area of an $SiO_2$-$Al_2O_3$ system containing $B_2O_3$.
Figure 3:
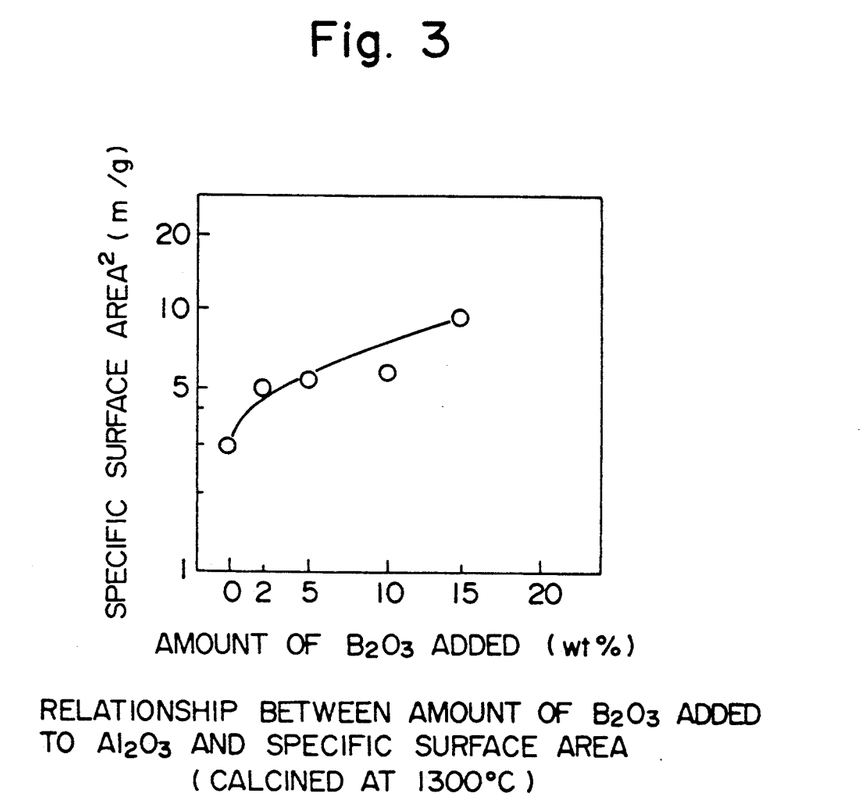
FIG. 3 is a graph illustrating a relationship between $B_2O_3$ content and specific surface area of an $B_2O_3$-$Al_2O_3$ system obtained by adding $B_2O_3$ to $Al_2O_3$.

An optimal amount of silica for increasing the thermal stability of alumina may preferably be 10 to 20% by weight as illustrated in FIG. 1. Then, an optimal amount of boria for alumina-silica is about 5% by weight of boria as illustrated in FIG. 2, and the resulting alumina-silica-boria composite oxide has a thermal stability much higher than the silica-alumina composite oxide. The oxide obtained by adding boria to alumina exhibits a higher thermal stability with an increasing boria content as illustrated in FIG. 3, but is much lower than that of the silica-boria-alumina ternary system.

Therefore, the three-component composite oxide composed of silica, boria and alumina is excellent as a heat-resistant composition, and its optimal proportion is 4 to 19% by weight of $SiO_2$, 3 to 10% by weight of $B_2O_3$ and the balance $Al_2O_3$. If $SiO_2$ is less than 4% by weight or equal to or higher than 19% by weight, or if $B_2O_3$ is less than 3% by weight or equal to or more than 10% by weight, the composition has a lower heat resistance, with the result that the specific area decreases significantly when used for a long time at a high temperature.

Presumably, the high heat resistance of the composite oxide composed of silica, boria and alumina is ascribable to the fact that the composite oxide calcined at 1,200° to 1,400° C. is stable and made of crystals including mullite structure and aluminum borate having high heat resistances, respectively. Generally, the mullite structure is composed of $3Al_2O_3.2SiO_2$, while the aluminum borate is composed of $9Al_2O_3.2B_2O_3$. Both structures have an orthorhombic crystal structures. The composite oxide contains excessive $Al_2O_3$ as solid solution in the mullite. The excessive $Al_2O_3$ combines with $B_2O_3$ to form a $9Al_2O_3.2B_2O_3$ phase to thereby increase heat resistance, and in addition, oxygen in palladium oxide interacts with lattice oxygen in the stable oxide to increase the thermal stability of the palladium oxide. Consequently combining all these factors, the composition can exhibit a high heat resistance and a high combustion resistance.

In two-component oxide systems such as alumina-silica and alumina-boria, not only the high temperature stabilities of the two-component oxide systems themselves are insufficient but also there are less interaction between the two-component oxide and palladium oxide carried thereon. As a result, palladium oxide is thermally decomposed at high temperatures to produce palladium or palladium oxides having small valences, which have low activities for the combustion of combustible gases.

Therefore, it is required that the oxidation catalyst has palladium carried on the three-component composite oxide composed of mullite containing alumina as a medium, and aluminum borate.

Figure 4:
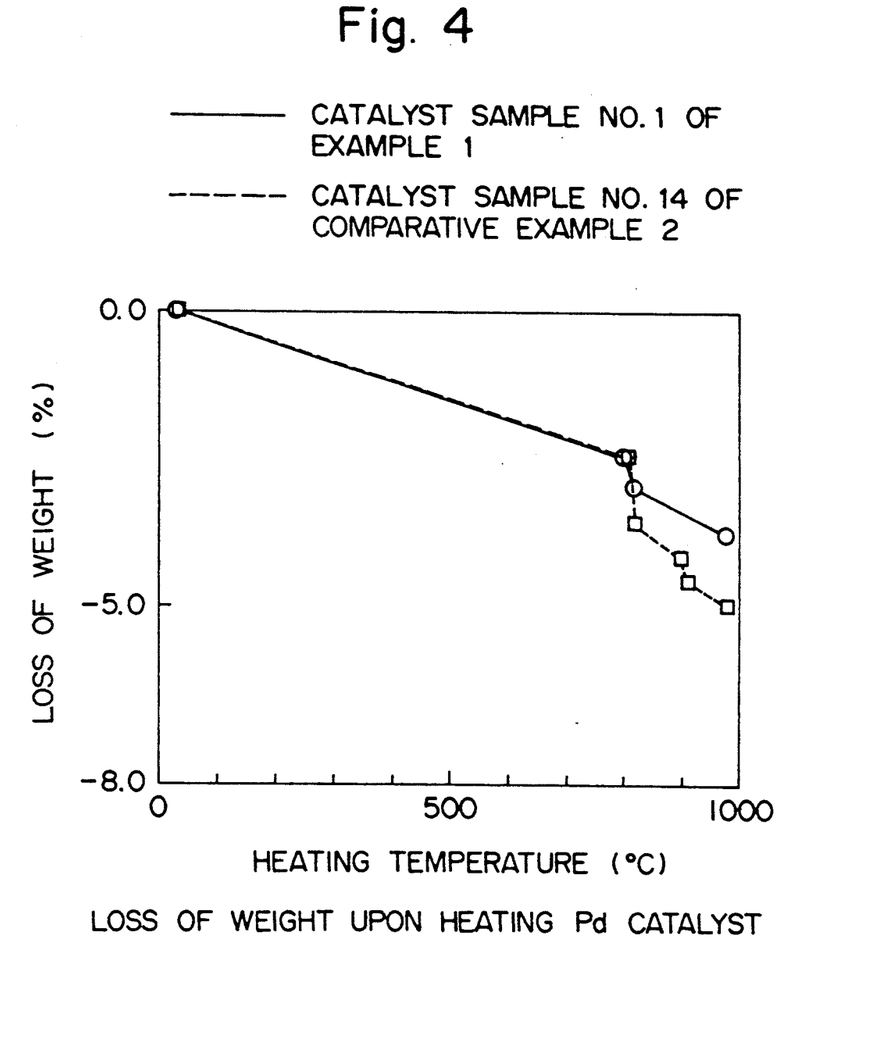
FIG. 4 is a graph illustrating weight loss upon heating of a catalyst obtained in Example 1 (sample No. 1) and a catalyst obtained in Comparative Example 2 (sample No. 14).

FIG. 4 is a graph which illustrates results of measurement on the catalyst of the invention and conventional catalyst for the relationship between temperature at which thermogravimetric analysis is carried out and weight loss. As is apparent from FIG. 4, an abrupt weight loss is observed at about 820° C. This weight loss is due to release of oxygen from palladium oxide on the catalyst. The state of surface palladium was measured by XPS (X-ray Photoelectron Spectroscopy), and the results obtained are shown in Table 1. It can be seen from Table 1 that in the catalyst of the invention, palladium as an active species exists in the form of palladium oxide on the surface of the catalyst, and the amount of oxygen released is small even at high temperatures, indicating that the state of palladium oxide is well maintained. The conventional catalyst had a large amount of oxygen released, and the results of XPS revealed that palladium exists in the form of reduced palladium or a small valence palladium.

The composite oxide used composing of silica and boria can be obtained as follows. An alumina hydrate slurry prepared, for example, by hydrolysis of an aqueous aluminum sulfate solution and an aqueous sodium aluminate solution is mixed with an aqueous sodium silicate solution. The resulting alumina-silica hydrate slurry is filtered and washed to obtain an alumina-silica hydrate cake. To this is added an aqueous orthoboric acid solution in an amount such that boron is present in the solution in an amount of 3 to 10% by weight in terms of $B_2O_3$, and the mixture is well mixed. The resulting alumina-silica-boron mixed hydrate is spray-dried, and then calcined at 600° to 1,400° C. The thus calcined alumina-silica-boron mixed hydrate, which can be used as it is, is kneaded under heating via a heating jacket in a kneader, and extruded through an extruder with a die having a desired shape. Then, the molded article is dried at 80° to 120° C. and calcined at 600° to 1,400° C. The thus calcined product can be used as it is, or may be pulverized to a mean particle diameter of 25 μm and used as a powder.

Palladium, i.e., the active component of the catalyst, can be carried on the composite oxide by a so-called palladium salt dipping method or a liquid absorption method. Suitable noble metal salts for carrying palladium, which may be used, are the chloride, nitrate, acetate, ammine complex salt, organic complex salts and the like. That is, a molded product of the composite oxide or a carrier coated or covered with the composite oxide is dipped in an aqueous solution of a palladium salt to have the palladium salt dipped thereon, and then the dipped molded product or carrier is removed from the solution, dried, calcined and/or reduced to produce a catalyst.

Alternatively, the catalyst of the present invention can be prepared as follows. First, a palladium salt is adsorbed on the powder of the composite oxide, which then is calcined and/or reduced. The thus-treated powder is molded with an extruder or converted into a slurry and coated on the surface of a heat-resistant porous support. It is necessary that the amount of the palladium salt to be carried is 3 to 100 g/liter of catalyst support in terms of palladium metal. Particularly, a catalyst which carries 5 to 80 g/liter of palladium exhibits an excellent performance. If the amount of palladium carried is less than 3 g/liter, heat resistance is insufficient and the catalyst has a short life when used at high temperatures while the amount of palladium carried exceeding 100 g/liter results in less increase in the performance of the catalyst, and hence, from an economical viewpoint, there is no need to add a palladium salt in amounts more than 100 g/liter in terms of palladium.

Covering the surface of a heat-resistant porous support with the composite oxide composed of silica, boria and alumina, or with the composite oxide carrying palladium thereon, can be carried out, for example, by the following method. That is, the composite oxide is converted into a slurry in a concentration of about 40%, and a heat-resistant porous support is dipped in the slurry. Thereafter, the support is taken out and excessive slurry is blown away with a stream of pressurized air to dry the support. The support is then calcined at about 500° C. to obtain a catalyst which has a surface cover solid content of 30 to 180 g/liter of support, preferably 60 to 150 g/liter of support.

EXAMPLE 1

A stainless steel reaction vessel equipped with a stirrer and having an inner volume of 100 liters was charged with 49.5 liters of water, to which was added 9,540 g of an aqueous aluminum sulfate solution containing aluminum sulfate in an amount of 774 g in terms of $Al_2O_3$. The mixture was heated to a setpoint of 70° C. While stirring, an aqueous sodium aluminate solution containing sodium aluminate in an amount of 1,275 g as Al was added thereto dropwise to obtain a slurry of alumina hydrate at pH 9.0. Then, 55 g of 30% nitric acid was added to the slurry with stirring, followed by adding 1,800 g of an aqueous sodium silicate solution containing sodium silicate in an amount of 252 g as $SiO_2$ to obtain an alumina-silica hydrate at pH 8.5, which was filtered and washed to obtain an alumina-silica hydrate cake. To the alumina-silica hydrate cake (6,760 g) (1,014 g as alumina-silica) a solution obtained by dissolving 94.4 g of orthoboric acid (53.4 g as $B_2O_3$) of guaranteed quality in 1,416 ml of hot water at 80° C., was added and the mixture was stirred for 30 minutes to obtain a slurry, a portion of this slurry was then spray-dried and calcined in an electric furnace at 1,200° C. for 10 hours to obtain a composite oxide powder A composed of silica-boria-alumina, i.e., 10.5% of $SiO_2$, 5.0% of $B_2O_3$, and 84.5% of $Al_2O_3$, and having a mean particle diameter of 5 μm. Then, the remainder of the slurry was kneaded with heating in a kneader and molded through an extruder having a die of 5.0 mm in diameter, dried, and calcined in an electric furnace at 1,200° C. for 10 hours to obtain a molded carrier B of 5 mm in diameter and 3 to 5 mm in length. Thereafter, the molded product was pulverized to obtain a complex oxide powder C composed of silica-boria-alumina and having a mean particle diameter of 20 μm. These powders and molded product were measured for their specific surface areas by a BET method using nitrogen. Each of them had a specific surface area of 45 m²/g.

EXAMPLE 2

The composite oxide powder A composed of silica-boria-alumina prepared in Example 1 was converted into a slurry together with commercially available alumina sol as an adhesive mass and water, and the slurry thus obtained was coated on a cordierite honeycomb support substrate (diameter 4 inches×length 2 inches, volume: 0.412 liter, 400 cells/in²) in an amount of 80 g/liter of support substrate on dry basis, dried at 90° C. for 12 hours, and calcined at 600° C. for 3 hours in the air to obtain a catalyst carrier. Then, the carrier was dipped in an aqueous palladium chloride at room temperature for 30 minuets so that the carrier contains 7 g/liter of palladium, followed by heating at 90° C. for 1 hour. Thereafter, the carrier was dried at 90° C. for 12 hours, and calcined at 500° C. for 3 hours in air, and then reduced at 200° C. for 2 hours in a hydrogen flow to obtain catalyst sample No. 1.

A catalyst sample No. 2 was prepared in the same manner as above except that the composite oxide powder C obtained in Example 1 was used.

EXAMPLE 3

The molded carrier B (100 ml) obtained in Example 1 was dipped in an aqueous palladium chloride solution containing palladium in an amount of 7 g/liter of carrier at room temperature for 60 minutes, and palladium was transferred on to the carrier at 90° C. for 1 hour. Then, the carrier was dried at 90° C. for 12 hours, calcined at 500° C. for 3 hours in air, and reduced in a hydrogen flow at 200° C. for 2 hours to obtain a catalyst sample No. 3.

EXAMPLE 4

The procedures in Example 1 for the production of B were repeated except that the amount of the aqueous sodium silicate solution to be added to the alumina hydrate slurry was varied such that the weight ratio of $Al_2O_3/SiO_2$ was 80/20 or 95/5 to obtain composite oxide powders D and E composed of silica-boria-alumnia, more specifically, 19.0% of $SiO_2$, 5.0% of $B_2O_3$, 76.0% of $Al_2O_3$, and 4.8% of $SiO_2$, 5.0% of $B_2O_3$, 90.2% of $Al_2O_3$, respectively. The specific surface areas of the powders D and E were measured by a BET method using nitrogen to be 45 and 40 m²/g, respectively. The composite oxide powder D and E were used in the method for the production of catalysts in Example 2 to obtain catalyst samples Nos. 4 and 5, respectively.

EXAMPLE 5

Calcined composite oxide powders F, G, H, I and J composed of silica-boria-alumina were obtained using the method for the production of the composite oxide A in Example 1 at various calcination temperatures of 600° C., 1,000° C., 1,100° C., 1,300° C. and 1,400° C. The calcined powders obtained were measured on their specific surface areas by a BET method using nitrogen. The calcined powders F, G, H, I and J had specific surface areas of 387, 123, 66, 28 and 11 m²/g, respectively. Then, the calcined composite oxide powder F to J were used in the method for the production of catalysts in Example 2 to obtain catalyst samples Nos. 6, 7, 8, 9 and 10, respectively.

EXAMPLE 6

A catalyst composed of silica-boria-alumina was prepared in advance, which contained uniformly 12% by weight of palladium per composite oxide powder using the composite oxide powder C composed of silica-boria-alumina in Example 1. The catalyst powder, together with commercially available alumina sol as an adhesive mass and water, was converted into a slurry and the slurry thus obtained was coated on a cordierite honeycomb support in an amount of 60 g/liter of support on dry basis. After adjusting the amount of palladium so that the carrier contained palladium in an amount of 7.2 g/liter of carrier, the composition was dried at 90° C. for 12 hours, and calcined at 500° C. for 3 hours in air to obtain a catalyst sample No. 11.

COMPARATIVE EXAMPLE 1

The alumina-silica hydrate cake described in Example 1 was spray-dried to obtain 11.0% silica 89.0% alumina, and the composition was calcined at 1,200° C. for 10 hours in air to obtain a composite oxide powder K composed of silica-alumina. The powder K was coated on a honeycomb support in the same manner as in Example 2 so that 7 g/liter of palladium was carried thereon to obtain a catalyst sample No. 13.

COMPARATIVE EXAMPLE 2

A solution was added to a commercially available pseudo-boehmite alumina hydrate. The solution used was obtained by dissolving lanthanum nitrate, strontium nitrate or barium nitrate in 2,000 ml of hot water at 80° C. so that 10% by weight base on $Al_2O_3$ of metal oxides were present. The mixture was stirred for 30 minutes to obtain a slurry. The slurry was then spray-dried, calcined in an electric furnace at 1,000° C. for 10 hours to obtain either alumina-lanthanum oxide powder M, alumina-strontium oxide powder N, or alumina-barium oxide power O. The oxide powders thus obtained were used in the method for the production of catalysts in Example 2 to obtain catalyst samples Nos. 14, 15 and 16, respectively.

EXAMPLE 7

The method for the production of catalysts in Example 2 was repeated except that palladium was supported on the carrier in an amount of 3 g/liter, 5 g/liter, 10 g/liter, 40 g/liter, or 80 g/liter to obtain catalyst samples Nos. 17, 18, 19, 20 and 21, respectively.

COMPARATIVE EXAMPLE 3

The method for the production of catalysts in Example 2 was repeated except that palladium was supported on the carrier in an amount of 2 g/liter to obtain a catalyst sample No. 22.

TESTING METHOD FOR CATALYST PERFORMANCE

Each of the catalyst samples obtained in Examples 2 to 7 and Comparative Examples 1 to 3 were evaluated for their characteristics in the oxidation reaction of methane. The reaction was performed under the following conditions:

Gas velocity: 10 liter/min.

Reaction gas composition: 1 vol. % of $CH_4$, 3.5 vol. % of $O_2$, and the balance $N_2$
Amount of catalyst: 5 ml
$SV = 1.2 \times 10^5 \, hr^{-1}$ The initial activity of catalyst was evaluated in terms of reaction temperature at 95% conversion. Lower temperatures suggest higher catalyst activities. The heat resistance of catalyst was evaluated in terms of conversion at a reaction temperature of 600° C. after heat treatment at 1,200° C. for 10 hours. In order to study differences in the catalyst performance, particularly heat resistance, between Examples and Comparative Examples, the oxidation state of palladium on the surface of catalyst after calcination at 1,200° C. for 10 hours was examined by analyzing Pd3d peak spectrum on XPS.

To note, in all the catalyst tested, the state of palladium before heat treatment was $PdO_2$.

Blend ratios, performances of catalysts, state of surface palladium after calcination are shown in Table 1.

The results of evaluation of catalysts shown in Table 1 confirmed that, as in the catalyst samples Nos. 1 to 11 and 17 to 21 in Examples 2 to 7, the catalyst of the present invention, obtained by having a high concentration of palladium active ingredient, carried on a molded carrier prepared by extrusion of a composite oxide powder composed of silica-boria-alumina or on a carrier coated on a cordierite honeycomb support, retained palladium as its oxide even after calcination at 1,200° C., and had a low reaction temperature indicative of a high initial activity and an excellent heat resistance. By comparison the catalysts obtained by coating a composite oxide powder composed of silica-alumina or boria-alumina on a cordierite honeycomb support and having palladium carried on the carrier, i.e., the catalyst samples Nos. 12 and 13 in Comparative Example 1, and the catalysts obtained by coating a composite oxide of alumina-lanthanum, alumina-strontium or alumina-barium on a cordierite honeycomb support and having palladium supported on the carrier, i.e., the catalyst samples Nos. 14 to 16 in Comparative Example 2, all had very poor heat resistances. It is clear that poor heat resistances are ascribable to thermal decomposition of palladium oxide at active sites after heat treatment to palladium oxides with lower valences or palladium having a valency of completely 0.

As apparent from the catalyst samples Nos. 1 and 2 in Example 2 and the catalyst samples Nos. 4 and 5 in Example 4, catalysts obtained by coating a composite oxide powder composed of silica-boria-alumina, more specifically 5% by weight of $B_2O_3$, 5 to 19% weight of $SiO_2$, 76% to 90% weight of $Al_2O_3$ on a carrierite honeycomb support and having palladium carried on the carrier exhibited excellent performances.

Further, the catalyst samples Nos. 1 and 2 in Example 2 and the catalyst samples Nos. 6 and 10 in Example 5, catalysts obtained by coating a calcined composite oxide powder prepared by a composite oxide powder composed of silica-boria-alumina and calcined at a temperature within the range of 600° to 1,400° C. on a cordierite honeycomb support with palladium supported on the carrier, had excellent performances.

As indicated by the catalyst sample No. 22 in Comparative Example 3, catalyst sample No. 2 in Example 2 and catalyst samples Nos. 17, 18, 19, 20 and 21 in Example 7, initial activity and heat resistance increased with increasing amount of carried palladium particularly 2, 3, 5, 7, 10, 40, or 80 g/liter, with the amount of palladium of 3 g/liter or more giving satisfactory results.

As indicated by the catalyst sample No. 11 in Example 6, a catalyst having an excellent heat resistance can also be obtained by a method in which a composite oxide powder composed of silica-boria-alumina was coated on a cordierite honeycomb support substrate which had been provided with palladium in advance to endow it with catalyst activity.

While in the above-described Examples and Comparative Examples, the composite oxide powder composed of silica-boria-alumina or the like was applied on a heat-resistant porous support having a honeycomb structure to have an active metal supported thereon, almost similar results as above were obtained when catalysts obtained by coating the composite oxide powder composed of silica boria-alumina and produced in the same manner as above on a ceramics perforated plate, a cloth-like fabrics, a metallic perforated plate, a wire mesh, an expanded metal, a metal foam or the like and having an active metal ingredient carried thereon were tested.

Using the composite oxide composed of silica, boria and alumina, having an excellent thermal stability, the oxidation catalyst of the present invention shows a small decrease in specific surface area upon use at high temperatures, and can prevent the conversion of palladium oxide, active ingredient, carried in the cover or coating layer into reduced palladium as a result of interaction with the composite oxide.

The oxidation catalyst of the present invention has a much improved heat resistance as compared with the conventional catalysts and the oxidation catalysts prepared by the conventional methods, and an excellent reaction activity at both low temperatures and high temperatures, thus ensuring a prolonged service life.

TABLE 1

| | Catalyst Sample Number | Composition of composite Oxide (% by weight) | Calcination Temperature (°C.) | Amount of Pd Carried (g/l) | Initial Activity (Temperature Showing 95% Conversion) (°C.) | Heat Resistance (% Conversion at 600° C.) | State of Palladium After Calcination at 1,200° C. for 10 hours |
|---|---|---|---|---|---|---|---|
| Example 2 | 1 | $Al_2O_3$—$SiO_2$—$B_2O_3$ (84.5-10.5-5.0) | (1,200) | 7 | 275 | 95 | PdO, $PdO_2$ |
| | 2 | $Al_2O_3$—$SiO_2$—$B_2O_3$ (84.5-10.5-5.0) | (1,200) | 7 | 275 | 94 | PdO, $PdO_2$ |
| Example 3 | 3* | $Al_2O_3$—$SiO_2$—$B_2O_3$ (84.5-10.5-5.0) | (1,200) | 7 | 250 | 100 | PdO, $PdO_2$ |
| Example 4 | 4 | $Al_2O_3$—$SiO_2$—$B_2O_3$ (76.0-19.0-5.0) | (1,200) | 7 | 280 | 93 | PdO, $PdO_2$ |
| | 5 | $Al_2O_3$—$SiO_2$—$B_2O_3$ (90.2-4.8-5.0) | (1,200) | 7 | 285 | 92 | PdO, $PdO_2$ |
| Example 5 | 6 | $Al_2O_3$—$SiO_2$—$B_2O_3$ (84.5-10.5-5.0) | (600) | 7 | 310 | 81 | PdO, $PdO_2$ |
| Example 2 | 7 | $Al_2O_3$—$SiO_2$—$B_2O_3$ | (1,000) | 7 | 295 | 87 | PdO, $PdO_2$ |

TABLE 1-continued

| | Catalyst Sample Number | Composition of composite Oxide (% by weight) | Calcination Temperature (°C.) | Amount of Pd Carried (g/l) | Initial Activity (Temperature Showing 95% Conversion) (°C.) | Heat Resistance (% Conversion at 600° C.) | State of Palladium After Calcination at 1,200° C. for 10 hours |
|---|---|---|---|---|---|---|---|
| | 8 | $Al_2O_3$—$SiO_2$—$B_2O_3$ (84.5-10.5-5.0) | (1,100) | 7 | 290 | 93 | PdO, $PdO_2$ |
| Example 5 | 9 | $Al_2O_3$—$SiO_2$—$B_2O_3$ (84.5-10.5-5.0) | (1,300) | 7 | 265 | 85 | PdO, $PdO_2$ |
| | 10 | $Al_2O_3$—$SiO_2$—$B_2O_3$ (84.5-10.5-5.0) | (1,400) | 7 | 307 | 83 | PdO, $PdO_2$ |
| Example 6 | 11 | $Al_2O_3$—$SiO_2$—$B_2O_3$ (84.5-10.5-5.0) | (1,200) | 7.2 | 280 | 94 | PdO, $PdO_2$ |
| Comparative Example 1 | 12 | $Al_2O_3$—$SiO_2$ (89.0-11.0) | (1,200) | 7 | 320 | 60 | Pd, PdO |
| Comparative Example 1 | 13 | $Al_2O_3$—$B_2O_3$ (94.4-5.6) | (1,200) | 7 | 400 | 20 | Pd, PdO |
| Comparative Example 2 | 14 | $Al_2O_3$—$La_2O_3$ (90.0-10.0) | (1,000) | 7 | 330 | 54 | Pd, PdO |
| | 15 | $Al_2O_3$—$SrO_2$ (90.0-10.0) | (1,000) | 7 | 320 | 52 | Pd, PdO |
| | 16 | $Al_2O_3$—BaO (90.0-10.0) | (1,000) | 7 | 320 | 50 | Pd, PdO |
| Example 7 | 17 | $Al_2O_3$—$SiO_2$—$B_2O_3$ (84.5-10.5-5.0) | (1,200) | 3 | 310 | 70 | PdO, $PdO_2$ |
| | 18 | $Al_2O_3$—$SiO_2$—$B_2O_3$ (84.5-10.5-5.0) | (1,200) | 5 | 280 | 93 | PdO, $PdO_2$ |
| Example 7 | 19 | $Al_2O_3$—$SiO_2$—$B_2O_3$ (84.5-10.5-5.0) | (1,200) | 10 | 270 | 95 | PdO, $PdO_2$ |
| | 20 | $Al_2O_3$—$SiO_2$—$B_2O_3$ (84.5-10.5-5.0) | (1,200) | 40 | 260 | 98 | PdO, $PdO_2$ |
| | 21 | $Al_2O_3$—$SiO_2$—$B_2O_3$ (84.5-10.5-5.0) | (1,200) | 80 | 240 | 100 | PdO, $PdO_2$ |
| Comparative Example 2 | 22 | $Al_2O_3$—$SiO_2$—$B_2O_3$ (84.5-10.5-5.0) | (1,200) | 2 | 390 | 30 | PdO, $PdO_2$ |

*Extruded product

What is claimed is:

1. A catalyst for oxidizing a carbon-containing compound, comprising:
   a composite oxide powder composed of 4 to 19% by weight of silica, 3 to 10% by weight of boria, and the balance alumina, and
   palladium in an amount of 3 to 100 g per 1 liter of said powder carried on said powder.

2. A catalyst for oxidizing a carbon-containing compound, comprising:
   a molded article composed of a composite oxide powder composed of:
   4 to 19% by weight of silica, 3 to 10% by weight of boria, and the balance alumina, and
   palladium in an amount of 3 to 100 g per liter of said powder carried on said molded article of said composite powder.

3. The catalyst for oxidizing a carbon-containing compound as claimed in claim 1, wherein said catalyst is carried on a heat-resistant support.

4. A catalyst for oxidizing a carbon-containing compound, comprising a heat-resistant support having carried thereon a composite oxide powder composed of 4 to 19% by weight of silica, 3 to 10% by weight of boria, and the balance alumina, and palladium in an amount of 3 to 100 g per liter of said support carried on said support.

5. The catalyst for oxidizing a carbon-containing compound as claimed in claims 3 or 4, wherein said heat-resistant support is a honeycomb structure, a perforated plate or a cloth-like fabric, made of heat-resistant ceramic composed mainly of at least one member selected from the group consisting of cordierite, mullite, alumina, silica, alumina titanate, zirconia, silicon carbide, and silicon nitride.

6. A catalyst for oxidizing a carbon-containing compound as claimed in claims 3 or 4, wherein said heat-resistant support is a porous metal plate selected from a perforated plate, a wire mesh, a punching metal, an expanded metal, or a metal foam, made of a heat-resistant metal selected from the group consisting of iron, copper, nickel, chromium, titanium, tungsten, and zirconium, or a heat-resistant alloy composed mainly of said heat-resistant metal.

7. A method for producing the catalyst of claim 1, comprising the steps of:
   providing a composite oxide powder composed of 4 to 19% by weight of silica, 3 to 10% by weight of boria, and the balance alumina;
   dipping said composite oxide powder in a solution containing palladium;
   drying said dipped powder; and
   calcining said dried powder.

8. A method for producing the catalyst of claim 2, comprising the steps of:
   providing a molded article of a composite oxide powder composed of 4 to 19% by weight of silica, 3 to 10% by weight of boria, and the balance alumina;
   dipping said molded article in a solution containing palladium;
   drying said dipped molded article; and
   calcining said dried molded article.

9. A method for producing the catalyst of claim 3, comprising the steps of:
   proving a composite oxide composed of 4 to 19% by weight of silica, 3 to 10% by weight of boria, and the balance alumina;

dipping said composite oxide powder in a solution containing palladium;
drying said dipped powder;
calcining said dried powder to prepare a palladium-carrying composite oxide powder;
preparing a slurry composed of said palladium-carrying composite oxide powder, an adhesive mass and water;
applying said slurry on a heat-resistant support;
drying the support; and
calcining the support.

10. A method for producing the catalyst of claim 4, comprising the steps of:

preparing a slurry composed of a composite oxide powder composed of 4 to 19% by weight of silica, 3 to 10% by weight of boria, and the balance alumina, an adhesive mass and water;
applying said slurry on a heat-resistant support;
drying said support;
calcining said carrier to prepare a heat-resistant support having carried thereon said composite oxide;
dipping said heat-resistant support having carried thereon said composite oxide in a solution containing palladium;
drying the support; and
calcinating the support.

* * * * *